July 13, 1943.  C. H. SCHUH  2,324,325
SURFACED CEMENT FIBER PRODUCT
Filed April 29, 1939  2 Sheets-Sheet 1

INVENTOR
CHARLES H. SCHUH
BY
ATTORNEY

July 13, 1943.  C. H. SCHUH  2,324,325
SURFACED CEMENT FIBER PRODUCT
Filed April 29, 1939   2 Sheets-Sheet 2

INVENTOR
CHARLES H. SCHUH
BY
ATTORNEY

Patented July 13, 1943

2,324,325

UNITED STATES PATENT OFFICE 2,324,325

SURFACED CEMENT FIBER PRODUCT

Charles H. Schuh, Ridgewood, N. Y., assignor, by mesne assignments, to Carbide and Carbon Chemicals Corporation, New York, N. Y., a corporation of New York Application April 29, 1939, Serial No. 270,798

10 Claims. (Cl. 154—45.9)

The present invention relates to the art of manufacturing low density, low moisture absorption products, and, more particularly, to a novel and improved cement-fiber product of non-warping and of non-shrinking character.

As those skilled in the art know, conventional and commercial high density cement-asbestos shingles were greatly subject to shrinkage and warping when laid with the butts free and exposed to strongly varying moisture conditions. In my co-pending applications, Ser. Nos. 60,447 now Patent No. 2,156,310, and 201,083 now Patent No. 2,156,311, I have disclosed a process for the production of low density, low moisture absorption products such as, for example, cement-fiber shingles containing a moisture-repellent agent and having a density below 96 lbs. per cu. ft. and a moisture absorption below 25%. It has been found that although such shingles were completely satisfactory under normal conditions, they had a tendency to bow upward when subjected to extreme moisture conditions such as, for example, when they were very rapidly dried from the exposed surface at elevated temperatures after being subjected to a strong rain.

I have discovered that the reason for this bowing or warping tendency resides in the extremely low rate of diffusion of moisture through the material combined with the expansion and contraction of the material due to water absorption and drying.

I have discovered that this tendency of low-density and low moisture absorption products may be eliminated in a simple and fool-proof manner.

It is an object of the present invention to provide a process for the production of low density, low moisture absorption cement-fiber products which are free from warping tendencies.

It is another object of the present invention to provide a low density, low moisture absorption cement-fiber product having a low permanent shrinkage value.

It is another object of the present invention to provide a novel and improved process for the manufacture of low-density, low moisture absorption cement-fiber products having greatly reduced residual expansion and contraction and increased stiffness and strength.

It is a further object of the present invention to provide a cement-fiber product of low density and low moisture absorption having a surface of increased hardness and resistance.

It is also within contemplation of the invention to provide a non-warping, low density cement-fiber wall-board having a lamination constituted of a plastic material on one side thereof.

The invention also contemplates a novel cement-fiber product of low-density and low moisture absorption having practically no tendency for warping and shrinking, great strength and hardness and which can be manufactured and sold on a practical and commercial scale at a low price.

Other and further objects and advantages of the invention will become apparent from the following description taken in conjunction with the accompanying drawings, in which.

Figure 1:
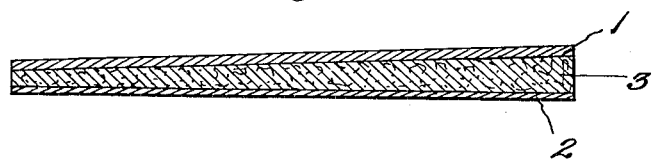
Fig. 1 illustrates a longitudinal sectional view of a surfaced cement-fiber product embodying the principles of the present invention.

Broadly stated, according to the principles of my invention, the warping tendency, excessive shrinkage and other disadvantages of low-density cement-fiber products are eliminated by reducing the rate of moisture flow or diffusion through the interior of the material and by reducing the expansion and contraction of the material at the surfaces and of the slab of material or shingle, as a whole. I have found that both of these objects are simultaneously accomplished to some extent either by redistribution of the fiber or of the water-repellent agent in the slab or shingle and are completely accomplished by redistribution of both. Thus, instead of using a uniform quantity of water-repellent agent throughout the product, I employ a higher percentage of the water-repellent agent near the surface and a lower percentage of said agent within the body or core portion of the slab or shingle. Likewise, instead of using a definite and uniform percentage of fiber throughout the body of the slab, a greatly reduced amount of fiber is used near the surfaces and an accentuated percentage of fiber is used throughout the body or core of the slab. Generally speaking, the percentage of fiber should not exceed 20% in any portion of the body of the slab, as otherwise the shrinkage becomes excessive and cannot be satisfactorily controlled. The redistribution of water-repellent agent and of fiber is so adjusted that the permanent shrinkage of the product is less than 0.20% and is preferably less than 0.10%. As a practical example, instead of using a uniform addition of, for instance, 5% of water-repellent agent throughout, 6% may be used near the surface and 4% throughout the body or core; and instead of using a uniform percentage of fiber, for instance 16%, throughout, 5% fiber is used near the surfaces and 20% is used throughout the body or core of the slab. This redistribution of water-repellent agent and of fiber may be carried out on an industrial scale by laying down the slab or sheet in three layers, including a thin surface layer, a thick core layer, and another thin surface layer, said surface layers having a higher content of water-repellent agent than the core layer. The three layers are preferably dewatered, pressed and worked together as one integral unit, slab or sheet. When finished and cured, the slab will be found to have a density of less than 95 pounds per cubic foot, a greatly reduced permanent shrinkage compared to that of the product having uniform distribution of fiber and water-repellent agent, the coefficient of expansion and contraction due to moisture saturation and drying will be lowered, the rate of surface evaporation will be lowered, the strength and rigidity of the slab will be increased and the bowing or warping tendency under adverse exposure will be satisfactorily controlled. A product of the described character is illustrated diagrammatically and by way of example in Fig. 1. As it will be readily observed from the drawings, the product is a flat bottom tapered one and consists of three density areas or layers of which two, the surface layers 1 and 2, are of greatly reduced thickness, while the third layer, or body or core portion 3, constitutes the major portion of the thickness of the product. Of course, in actual practice the individual layers are not as sharply defined as shown in Fig. 1 but there is a more gradual transition from one layer to the other. It is generally preferred to have the top density area or layer slightly thicker than the bottom one. The core portion may also comprise several layers or density areas of about the same fiber density. In some cases the percentage of fiber in the high fiber layer may be increased somewhat for instance up to about 23%. In such instance, it is desirable that the low fiber layer have its fiber percentage slightly reduced and its thickness slightly increased with respect to that of the high fiber layer. In addition, the adjustment may be partially made by increasing the differential of water proofing content between the high and low fiber layers.

Figure 2:
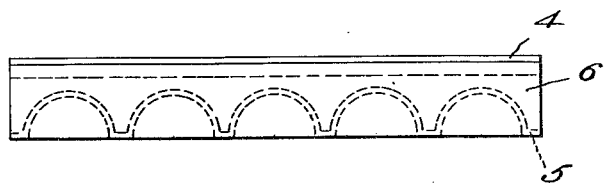
Fig. 2 depicts a butt edge elevation of a corrugated back product embodying the invention.

The product illustrated in Fig. 2 of the drawings is similar to the one shown in Fig. 1, with the difference, however, that the back surface thereof is corrugated. This product is likewise constituted of three density layers or areas of which the plane top layer 4 and the corrugated bottom layer 5 are of reduced thickness and core layer 6 is of substantial thickness. The products illustrated in Figs. 1 and 2 may find ready use as exposed shingle, or siding or boarding. Of course, they need not be tapered in section but may be of uniform section.

Figure 3:
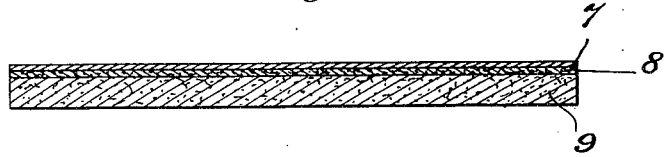
Fig. 3 shows a similar view to Fig. 1 of a non-warping, plastic laminated wallboard embodying the invention.

Fig. 3 depicts a non-warping, plastic-laminated structure, for example wallboard, embodying the invention and having a top layer 7 of plastic or resin lamination and of reduced thickness, an intermediate density layer 8 preferably of similar thickness constituted of a cement-fiber composition of low fiber content and a body or core density layer 9 of substantially greater thickness constituted of a cement-fiber composition having high fiber content, low density and low moisture absorption, as it will be described more fully hereinafter. It will be observed that in this instance the core layer is the back layer for reasons hereinafter stated.

Figure 4:
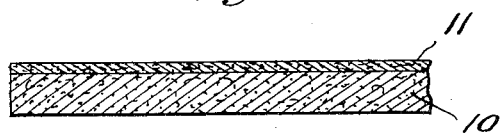
Fig. 4 illustrates a longitudinal sectional view of a modified embodiment of the invention constituted of two layers.

According to the foregoing features, the principles of the present invention may be applied to composite structures including strata of various characteristics, one or more of which may preferably comprise a cork layer, preferably of the character described in my copending application Serial No. 46,742, now Patent No. 2,156,309, and which may be combined as a preformed finished layer, or as a wet composition or matrix. It will be understood that novel composite products utilizing the layers of the character disclosed in my copending applications Ser. Nos. 46,742, now Patent No. 2,156,309, and 201,083, now Patent No. 2,156,311, may be made with or without the non-warping feature and other novel characteristics be obtained. Such composite structure may include as many strata, layers and combinations thereof as disclosed in said applications. For instance, I may make a product as illustrated in longitudinal section in Fig. 4 of the drawings. The composite product preferably comprises a cork layer 10 of substantial thickness and a facing layer 11 bonded to the top surface of the cork layer. This facing layer is preferably a low density cementitious layer preferably of the character disclosed in my aforesaid copending application, Ser. No. 201,083, now Patent No. 2,156,311. Such a composite product solves an old and very important problem in the art in that it provides an inexpensive light-weight material having excellent high heat-insulating and water-repellent properties and substantial strength. Where a two-layer structure is contemplated, it is preferred to cure and dry such layers before bringing them together and to secure them with a suitable bonding material such as disclosed in my prior application. This procedure will substantially reduce warping tendencies of the finished product.

For the purpose of giving those skilled in the art a better understanding of the invention, the following illustrative examples are given.

EXAMPLE No. 1

*Low density, low moisture absorption, non-warping slab, for instance, shingle*

To 2400 gallons of water in a beater are added 100 pounds of asbestos (J/M 5M grade) and the fiber is finely pulped with the beater set close so as to get a pulp having a large non-settling volume, (density dry weight less than about 1 pound per cubic foot), as described in my co-pending application, Serial No. 60,447, now Patent No. 2,156,310. While continuing the beating, 1780 pounds of Portland cement are added and 120 pounds of 50% paraffin emulsion prepared in accordance with the process disclosed in the said Patent No. 2,156,310. The finished pulp suspension is run into a vat. This will constitute a 5% by weight fiber and 6% by weight paraffin composition based on the solids.

Likewise, to 2400 gallons of water in the beater are added 150 pounds of news stock and 50 pounds of asbestos of the same grade and pulped to the same degree of fineness. To this are added 760 pounds of Portland cement and 80 pounds of 50% paraffin emulsion, made as before. This pulp mixture constitutes a 20% fiber and 4% paraffin composition based on the solids and is run into a second vat.

In a rectangular steel mold (8" x 16" by 6" deep) having a screen filter bottom, 4 pounds of the aqueous low fiber mixture from the first vat are run in evenly. Then, 21 pounds of the aqueous high fiber mixture from the second vat are run in over the first layer as evenly as possible. On top of the two layers 4.8 pounds of the aqueous low fiber pulp from the first vat are run in as evenly as possible. During the filling operation, a major portion of the water has filtered off. A fairly tight-fitting steel plate is then pressed down into the mold to a pressure of about 60 to 100 pounds square inch. The mold is then opened and the slab or shingle removed. Any grain or markings desired on the finished shingle are cut in the top plate and pressed in during the molding. Likewise, the back of the shingle is preferably corrugated at the same time. The shingle is then allowed to cure in the ordinary manner and when cured is preferably completely dried.

The resulting product is a now density, low moisture absorption shingle weighing less than two pounds and having a butt of about ½ inch in thickness and having low permanent shrinkage and low expansion and contraction values and being free from warping tendencies. The resulting product will have a density of less than 95 pounds per cubic foot, and the middle stratum will have a multiplicity of substantially uniformly distributed substantially non-visible voids between particles of the composition that will constitute at least about $$100 - \frac{D}{5}\left[3 + \frac{f^2}{20}\right]$$

per cent of the total volume of the composition, wherein D is the density in pounds per cubic foot and $f$ is the percentage of the finely divided fibrous material, as disclosed in Patent No. 2,156,311. The properties of this shingle will be readily understood from the accompanying curves. This shingle when placed in water for 24 hours will have an absorption of about 10%. If the shingle after being thus saturated by a 24 hr. immersion in water is nailed to a straight board at the thin end and placed before a heat reflector so that the exposed surface of the shingle will be subjected to a temperature of about 120 degrees F., the butt end of the shingle will not warp away from the board. Thus, the shingle embodying the invention is substantially free from warping tendencies even when exposed to such extreme conditions hardly, if ever, encountered in practical operation. When subjected to such a test, conventional high density asbestos-cement shingles will bow so that the butt end of the shingle may be a substantial distance away from the base board.

Figure 5:
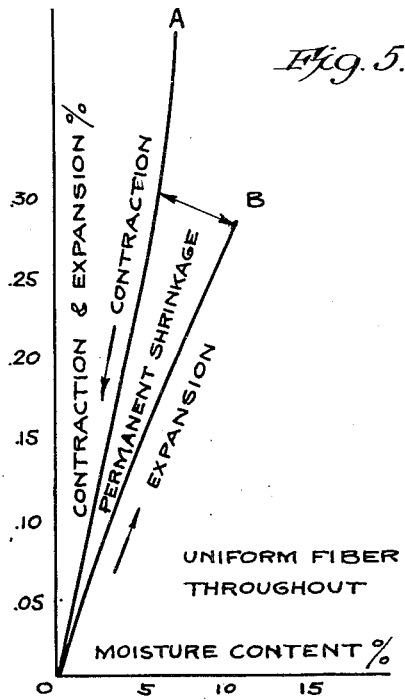
Fig. 5 is a continuous curve showing the relation between moisture content and contraction and expansion of a low-density, low-pressure cement fiber product.
Figure 7:
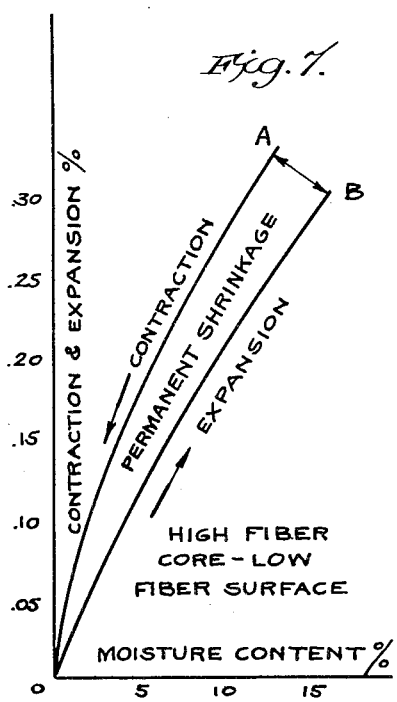
Fig. 7 depicts a continuous curve indicating the relation between the moisture content and the contraction and expansion of the product embodying the present invention.
Figure 6:
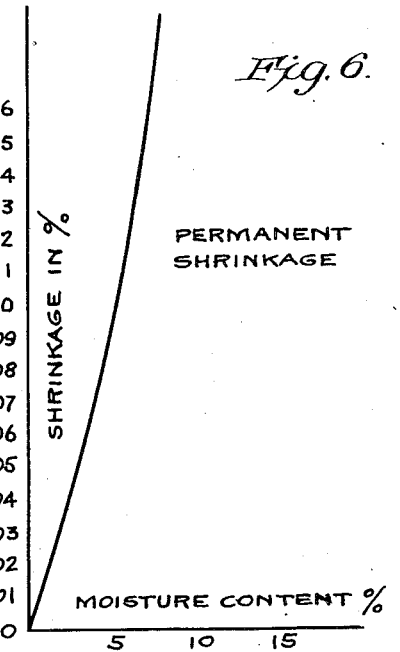
Fig. 6 illustrates a curve showing the relation between the moisture content and the permanent shrinkage of the aforesaid low-density product.
Figure 8:
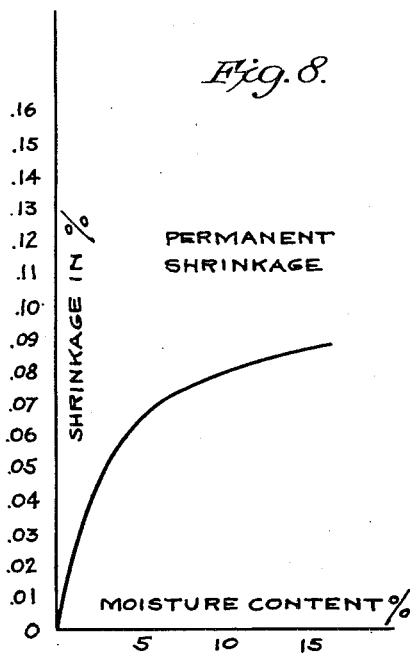
Fig. 8 is a curve showing the relation between the moisture content and the permanent shrinkage of the product embodying the invention.

Referring now to the curves illustrated in Figs. 5 to 8, Figs. 5 and 6 relate to a low density, low moisture absorption cement-fiber product prepared for instance in accordance with the principles of my Patents Nos. 2,156,310 and 2,156,311, and Figs. 7 and 8 show the same contraction and expansion and permanent shrinkage characteristics for the improved product of the present invention. In Fig. 5, the upper curve A is the line followed by the material when it is dried for the first time. As it appears from Fig. 5, the material has some shrinkage, for example, at 8% moisture content the shingle is 0.39% longer than when it has reached 0% moisture which is obviously true of any conventional cement-fiber product. When the material is resaturated again, it expands following the lower curve B. It expands less and when it has again reached a moisture content of 8%, for example, it has only expanded 0.22%. The difference between the two curves, A and B, 0.17% at this point, is a permanent shrinkage of the material due to drying and resaturation. If this difference is large, for example, if it exceeds 0.2%, the product will have a tendency to warp under adverse exposure conditions, as when rapidly dried on a roof from the exposure side when the butt ends are free. Generally speaking, a permanent shrinkage below 0.2% is satisfactory although it is preferred to maintain shrinkage values below 0.10%. When the rate of evaporation or drying at the exposed surface is greater than the rate of flow of moisture through the material, the exposed surface will become completely dried, while the bottom surface still has a moisture content. The top surface is therefore shrunk or shortened with respect to the bottom surface and the product warps upward.

The first step to correct this difficulty is to reduce to a minimum the permanent shrinkage and contraction and expansion values due to drying and resaturation. Figs. 7 and 8 show how this has been accomplished by the present invention. The permanent shrinkage of the unimproved product rises rapidly to values above 0.2% (Fig. 6), whereas the improved product has a permanent shrinkage which tapers off to a value below 0.1%, a direct reversal of the slope of the curve. For such small values warping can be completely eliminated.

The second corrective step of the present invention involves the reduction of the rate of evaporation at the surface to a value which is lower than the rate of diffusion of moisture through the body layer of material. This is accomplished by a thin surface layer which has a higher paraffin content and consequently a lower rate of diffusion than the body layer. As a result, evaporation at the surface under severe conditions is slowed down to a rate which will permit the body layer to dry out evenly, and avoid one side from becoming dry while the other side still has a moisture content. A thin surface layer has been found necessary on the bottom of the shingle as well as on the top to keep the shingle straight even when dried uniformly throughout, due to the fact that the high fiber layer in itself has a higher permanent shrinkage than the low fiber layer.

Thus, from the above considerations it is obvious that the present invention provides a new combination of principles for controlling warping tendencies particularly for products of the low density, low moisture absorption type. According to the invention, advantage is taken of the newly discovered properties of contraction and expansion, permanent shrinkage and of the reduced rates of moisture diffusion obtainable by dispersed paraffin, to correct certain tendencies of the material to warp when unevenly dried. These principles may be applied to wallboards as well as to shingles and other structures with equal or similar results. Other applications will be obvious after a discussion of the application of these newly determined characteristics and principles of the invention to the solution of a problem in the production of plastic, particularly resin, laminated wallboards.

Phenolic and urea resin-laminated wallboards are now made by laminating under heat and pressure a thin sheet or board of paper saturated with the resin on to a base board of various character. During the lamination process, there is considerable shrinkage of the resin sheet and if the resin lamination is united to one surface of the board only, the finished board will be bowed or warped, the resin surface being concave. For this reason it has been impossible heretofore to produce a commercially satisfactory, straight resin laminated board with the resin lamination on one side only. As a matter of fact, it has been necessary to laminate both surfaces of the board with the resin lamination to keep it straight. This of course greatly increased the cost. In addition, it has been possible to use only certain types of base boards, such as were not too hard and rigid, as for example, the combustible, hard pressed wood fiber boards, including Masonite boards. The fireproof high density commercial cement-asbestos boards have been unsatisfactory even when laminated on both sides. They did not "give" at all and the shrinkage of the resin laminations caused the lamination to crack. This was especially true of the urea laminations.

I have found that a low density, cement-fiber board made in accordance with the principles of the present invention with a high fiber core and a low fiber surface layer on one side only will make an excellent base board for applying resin laminations on one side only. The resin lamination is applied to the low fiber surface before the board has been dried. Under these conditions, the permanent shrinkage of the high fiber side will act to accurately counteract the shrinkage developed on the opposite side in the urea resin lamination during its application. The resultant laminated board will be straight. Moreover, the overall permanent shrinkage of the cement-fiber base board greatly reduces the stress set up in the resin lamination during curing and provides a finished product in which the resin lamination will not crack.

EXAMPLE No. 2

*Low density, cement-fiber, non-warping, non-cracking resin laminated wallboard*

Two batches of cement-fiber pulp are prepared in two vats having exactly the same compositions as used in Example 1. 21 pounds of aqueous high fiber composition from the second vat are run into the mold to form a first layer. Thereafter, 4.8 pounds of aqueous low fiber composition from the first vat are run in forming a second layer. The slab is then pressed at about 80 pounds square inch and is subsequently removed and cured, being kept moist at all times. After the normal curing period of about 4 weeks, the slab is allowed to dry to some extent so that the moisture content will be about 20% when the slab goes into the laminating press. In placing the slab in the press, the resin laminating sheet is placed on that side which is the low fiber side, or top, and which is smooth. The bottom surface of the slab is rough due to the impressions of the filter screen. This is an advantage as it allows the escape of vapor formed while drying during the laminating process. The lowest pressure consistent with good laminating practice for the materials used, usually in excess of 500 pounds square inch, is employed and the normal time, generally about 30 minutes, is allowed for curing in the press. When the laminated board is removed from the press, it will be found to be straight. It is preferred then to lay the board on a flat surface with the resin surface down and allow the base board to completely dry out. This final and complete bone drying may be accomplished in a dryer in a short time.

The finished product is a resin laminated board that is not warped and has the resin lamination on one side only. Moreover, the resin lamination will not crack. The resin laminated board is fireproof, has low density, low moisture absorption, low weight and may be manufactured on an industrial scale at a low cost.

In using various thicknesses of base board and various types of resin laminations, adjustments are necessary so that the shrinkage stresses set up on both sides of the base board are equalized. This may be readily accomplished in accordance with the principles of the present invention. If the finished board is concave to the resin side, a greater stress must be induced on the opposite base side, for example, by starting the laminating process with a higher moisture content in the base board, by increasing the thickness of the high fiber layer, or by increasing the difference in fiber content between the high fiber and low fiber layers, and by increasing the overall thickness of the base board, etc. All of these factors tend to induce a greater counteracting stress and the opposite procedure will, of course, be resorted to when the resin surface of the finished board is warped to a convex curvature. From the knowledge of the approximate shrinkages involved, taken from the illustrated curves and the known properties of the used resin lamination, those skilled in the art will have no difficulty to determine the approximate solution for a given case. Further corrections may then be made by a few tests and the desired result may be accurately and easily achieved. It has been found that a urea laminated board thus made will remain straight even when immersed under water for several days.

Although the present invention has been described in connection with a few preferred embodiments thereof, variations and modifications may be resorted to by those skilled in the art without departing from the principles of the present invention. Thus, in place of Portland cement, other cementitious material may be used, for example, other hydraulic or other cements as natural cement, Roman cement, gypsum, magnesite, etc. Likewise, although the preferred water-repellent agent is paraffin, various other water-repellent solids or semi-solids may be used such as waxes, ester gums, and/or natural and synthetic resin materials, of which Chinese wax, carnauba wax, rosin, Halowax (chlorinated naphthalene), shellac, or beeswax may be used in the place of paraffin with substantial waterproofing results, as this is more fully disclosed in my co-pending application Ser. No. 201,082, now Patent 2,232,977, filed April 9, 1938. I consider all of these variations and modifications as within the true spirit and scope of the present invention as disclosed in the foregoing description and defined by the appended claims.

The present application is a continuation in part of my co-pending applications, Ser. No. 3,578, filed January 25, 1935, now Patent No. 2,156,308; Serial No. 60,447, filed Jan. 23, 1936, now Patent No. 2,156,310; and Ser. No. 201,083, filed April 9, 1938, now Patent No. 2,156,311.

I claim:

1. A compressed stratiform product comprising three superposed adjacently different functional strata; one of said strata being of greater thickness and of lower density than either of the other two and having a moisture absorption of less than about 25% by weight when immersed in water for twenty-four hours; at least two of said strata comprising cement particles and water-repellent substance; one of said cementitious strata having the greatest thickness and including fiber in an amount more than about 20% but not exceeding about 23% by weight and water-repellent substance in an amount not exceeding about 4% by weight of the composition of said stratum, the balance being substantially cementitious material; and the other of said cementitious strata being immediately adjacent said stratum of greatest thickness and including fiber in an amount not exceeding about 5% and water-repellent substance in an amount more than about 4% but not exceeding about 6% by weight, the balance substantially being cementitious material.

2. A compressed stratiform product comprising three superposed adjacently different functional strata, each comprising cement particles and water-repellent substance; the middle stratum being of greater thickness and of lower density than either of the other two strata and including fiber in an amount more than about 20% but not exceeding about 23% by weight of the composition of said stratum, but in an amount in excess of any amount of fiber in either of said other two strata, and water-repellent substance in an amount not exceeding about 4% by weight; said water-repellent substance being concentrated in a lesser amount and said fiber being concentrated in a greater amount in said middle stratum than in either of said other strata, the balance consisting substantially of cementitious material in all strata; and the said difference in water-repellent substance concentration and fiber content between said middle stratum and said other two strata being sufficient to provide a substantial measure of control of warping tendencies of said product with changes in moisture content in said functional strata; said product having a permanent shrinkage of less than two-tenths per cent.

3. A compressed stratiform product comprising three superposed adjacently different functional strata, each including finely divided light-weight material, fiber and water-repellent substance; the middle stratum being of greater thickness and of lower density than either of the other two strata and having a fiber content greater than about 20% but not exceeding about 23% of the composition of said stratum, and the fiber content of each of the other two strata not exceeding about 5% by weight of the composition thereof; said water-repellent substance being concentrated in the amount of not less than about 4% in said middle stratum and in an amount of more than about 4% but not exceeding about 6% by weight in either of said other two strata; the balance being substantially finely divided light-weight material and cementitious material in all strata; whereby the moisture diffusion rate through said middle stratum is higher than either of said other two strata; the said difference in fiber content and rate of moisture diffusion between said middle stratum and the other two strata of said product being sufficient to provide said product with a permanent shrinkage of less than two-tenths per cent and to render said product substantially immune to warping tendencies with changes in moisture content of said functional strata.

4. A compressed stratiform product comprising three superposed adjacently different functional strata each including cement particles, fiber and water-repellent substance; the middle stratum being of greater thickness and of lower density than either of the other two strata and containing an amount of the order of about 20% by weight of the composition thereof and water-repellent wax in an amount of about 4% by weight of said composition; and said other two strata containing fiber in an amount of the order of about 5% by weight of the composition thereof and water-repellent wax in an amount of the order of about 6% by weight of the composition thereof; the balance consisting substantially of cement particles in all strata; said product being substantially immune to warping tendencies with changes in moisture content of said functional strata.

5. A compressed stratiform product comprising three superposed adjacently different functional strata; the principal stratum being of greater thickness and of lower density than either of the other two strata and comprising water-repellent substance in an amount not more than about 4%, fiber in an amount not less than about 20% but not exceeding about 23% by weight of the composition of said stratum, the balance consisting substantially of cement particles; the middle stratum being of a composition similar to that of said principal stratum but having a fiber content less than said principal stratum and not in excess of about 5% by weight and a water-repellent substance content in amounts of more than about 4% but not exceeding about 6% by weight, the balance consisting substantially of cement particles; and said third stratum comprising synthetic plastic and being immediately adjacent said middle stratum; said product being substantially free from warping and bowing tendencies with changes in moisture content in said functional stratum.

6. A compressed stratiform product comprising three superposed adjacently different functional strata; the principal stratum being of greater thickness and of lower density than either of the other two strata and comprising water-repellent substance in an amount not more than about 4% and fiber in an amount not less than about 20% but not exceeding about 23% by weight of the composition of said stratum, the balance consisting substantially of cement particles; the middle stratum being of a composition similar to said principal stratum but having a fiber content less than said principal stratum but not in excess of about 5% by weight and a water-repellent substance content in amounts of more than about 4% but not exceeding about 6% by weight, the balance consisting substantially of cement particles; and said third stratum comprising a urea resin lamination immediately adjacent said middle stratum; said product being substantially free from warping and bowing tendencies with changes in moisture content in said functional stratum.

7. A compressed stratiform product comprising three superposed adjacently different functional strata; the middle stratum being of greater thickness and of lower density than either of the other two strata and including principally cork particles, fiber and water-repellent substance; the other two strata comprising fiber in an amount no greater than about 5% by weight of the composition thereof and less than the fiber content of said middle stratum and water-repellent substance in amounts greater than about 4% but not exceeding about 6% by weight and more than the content of water-repellent substance of said middle stratum, the balance consisting substantially of cement particles; the moisture absorption of said middle stratum when immersed in water for twenty-four hours being greater than that for either of said other two strata; said product being substantially immune to warping tendencies with changes in moisture content of said functional strata.

8. A compressed low-density cement fiber roofing and siding product comprising three superposed adjacently different functional strata, each including cement particles, fiber and water-repellent substance; the middle stratum being of greater thickness and of lower density than either of the other two strata and having a fiber content in an amount between about 20% and about 23% by weight; the other two strata containing fiber not exceeding about 5% by weight and one having a greater thickness than the other; said water-repellent substance being concentrated in the amount of not more than about 4% in said middle stratum and in the amount of more than about 4% but not exceeding about 6% by weight in either of said other two strata; the balance consisting substantially of cement particles in all strata; whereby the moisture diffusion rate through said middle stratum is greater than that through either of said other two strata; said product having a permanent shrinkage of less than two-tenths per cent and being substantially immune to warping tendencies with changes in moisture content of said functional strata.

9. A compressed stratiform product comprising at least two superposed strata having different functional characteristics, one of said strata having a moisture-diffusion rate greater than that of the other; the principal stratum being constituted of finely divided light-weight material bonded together with a finely pulped fibrous material in an amount of about 20% to about 23% by weight and a dispersed water-repellent agent in an amount of not more than about 4% by weight and being of greater thickness and of lower density than the other stratum; and the stratum of lesser thickness being constituted of compressed cement finely divided fiber composition containing dispersed water-repellent agent in an amount of more than about 4% but not exceeding about 6% by weight and fiber not exceeding about 5% by weight, the balance consisting substantially of cement particles; said stratum of lesser thickness being bonded to one of the faces of said principal stratum with a relatively broad bonding zone and having a moisture absorption of less than about 25% by weight when immersed in water for 24 hours; the said product having a density less than 95 pounds per cubic foot, high heat-insulating and water-repellent properties, and substantial strength.

10. A compressed stratiform product comprising at least two superposed adjacently different functional strata as defined in claim 1, in which at least one of said strata has a multiplicity of substantially uniformly distributed substantially non-visible voids, said voids being between particles of the composition and constituting at least about $$100 - \frac{D}{5}\left[3 + \frac{f^2}{20}\right]$$

per cent of the total volume of said composition, where D is the density in pounds per cubic foot and $f$ is the percentage of the finely divided fibrous material.

CHARLES H. SCHUH.